United States Patent
Maeda

(10) Patent No.: US 11,220,192 B1
(45) Date of Patent: Jan. 11, 2022

(54) SYSTEMS AND METHODS FOR PROVIDING AN ADJUSTED STATE OF CHARGE LIMIT

(71) Applicant: Honda Motor Co., Ltd., Tokyo (JP)

(72) Inventor: Eri Izumi Maeda, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/907,681

(22) Filed: Jun. 22, 2020

Related U.S. Application Data

(63) Continuation-in-part of application No. 16/906,767, filed on Jun. 19, 2020.

(51) Int. Cl.
  *B60L 58/00* (2019.01)
  *B60L 58/12* (2019.01)
  *B60L 53/62* (2019.01)
  *B60L 53/53* (2019.01)

(52) U.S. Cl.
  CPC .............. *B60L 58/12* (2019.02); *B60L 53/53* (2019.02); *B60L 53/62* (2019.02)

(58) Field of Classification Search
  CPC ........... B60L 58/12; B60L 53/53; B60L 53/62
  See application file for complete search history.

(56) References Cited

U.S. PATENT DOCUMENTS

| | | | | |
|---|---|---|---|---|
| 8,054,038 B2* | 11/2011 | Kelty | ............... | B60L 58/15 320/109 |
| 8,509,988 B2* | 8/2013 | Uyeki | ............... | B60L 3/12 701/33.4 |
| 8,610,401 B2* | 12/2013 | Kim | ............... | B60L 53/62 320/109 |
| 9,764,729 B2* | 9/2017 | Hokoi | ............... | B60W 20/13 |
| 10,217,360 B2* | 2/2019 | Miura | ............... | G08G 1/146 |
| 10,906,422 B2* | 2/2021 | Ando | ............... | G01C 21/005 |
| 10,926,659 B2 | 2/2021 | Lee et al. | | |
| 10,953,765 B1 | 3/2021 | Sun et al. | | |

(Continued)

FOREIGN PATENT DOCUMENTS

| | | | | |
|---|---|---|---|---|
| JP | 2011205828 A | * | 10/2011 | |
| JP | 2013102609 A | * | 5/2013 | ............... H02J 7/04 |
| WO | WO2019126806 | | 6/2019 | |

OTHER PUBLICATIONS

Office Action of U.S. Appl. No. 16/906,767 dated Oct. 28, 2021, 18 pages.

*Primary Examiner* — Naum Levin
(74) *Attorney, Agent, or Firm* — Rankin, Hill & Clark LLP

(57) ABSTRACT

Systems and methods for providing an adjusted SOC limit are provided. In one embodiment, a system may include a recognition module, a position module, a charge state module, and a charging module. The recognition module is configured to identify a vehicle to receive a charge from a charging station. The position module is configured to determine a parked period when the vehicle will be present at the charging station based on a schedule. The charge state module is configured to calculate the adjusted SOC limit based on the parked period. The charge rate defines a charge period that is an amount of time that the charging station will provide charge to the vehicle. The adjusted SOC limit is calculated to reduce a time difference between the parked period and the charge period. The charging module is configured to set the adjusted SOC limit.

20 Claims, 4 Drawing Sheets

(56) References Cited

U.S. PATENT DOCUMENTS

| | | | |
|---|---|---|---|
| 2008/0243331 A1* | 10/2008 | Kato | ............... B60L 50/61 |
| | | | 701/29.5 |
| 2017/0166074 A1 | 6/2017 | Pflaum et al. | |
| 2017/0282736 A1 | 10/2017 | Goei | |
| 2019/0092177 A1 | 3/2019 | Malik et al. | |
| 2019/0275893 A1 | 9/2019 | Sham | |
| 2020/0082352 A1 | 3/2020 | Liu et al. | |
| 2020/0175614 A1 | 6/2020 | Fox et al. | |
| 2020/0262307 A1 | 8/2020 | Rosene et al. | |
| 2020/0409361 A1* | 12/2020 | Herman | ............ G06Q 50/30 |
| 2021/0065073 A1 | 3/2021 | Maeda et al. | |
| 2021/0074094 A1 | 3/2021 | Schumacher | |
| 2021/0086647 A1 | 3/2021 | Kiessling et al. | |
| 2021/0206286 A1 | 7/2021 | Choi et al. | |
| 2021/0281096 A1 | 9/2021 | Maeda et al. | |

* cited by examiner

SYSTEMS AND METHODS FOR PROVIDING AN ADJUSTED STATE OF CHARGE LIMIT

RELATED APPLICATIONS

This application is a continuation-in-part and claims priority to the application entitled "SYSTEMS AND METHODS FOR PROVIDING A PERSONALIZED STATE OF CHARGE" of Eri Izumi Maeda, application Ser. No. 16/906,767 filed on Jun. 19, 2020, which is expressly incorporated by reference herein.

BACKGROUND

Increasingly, vehicles are designed to be recharged using charging stations. For example, electric vehicles may use an electric motor to provide all or part of the mechanical drive power of the vehicle. Some types of electric vehicle may be charged from an external source via a charging station. A plugin electric vehicle may include batteries which store power from the electrical grid in an electrochemical cell. To facilitate charging of electric vehicles, charging stations may be often positioned in parking structures and lots. While the number of available charging stations is increasing, typically, a parking lot or structure may only have a few parking spots where vehicles may access the charging stations.

BRIEF DESCRIPTION

According to one aspect, a system for providing an adjusted SOC limit/ceiling is provided. The system may include a recognition module, a position module, a charge state module, and a charging module. The recognition module may be configured to determine an initial SOC limit for a vehicle associated with a user. The initial SOC limit may indicate an initial amount of charge that a charging station will provide to the vehicle to increase a charge level of the vehicle. The position module may be configured to estimate an arrival time of the user at the vehicle. The arrival time may be based on a current location of the user. The charge state module may be configured to calculate an adjusted SOC limit based on the arrival time of the user. The charging module may be configured to set the adjusted SOC limit so that the charging station will provide an adjusted amount of charge to the vehicle corresponding to the adjusted SOC limit.

According to another aspect, a method is provided. The method may include determining an initial SOC limit for a vehicle associated with a user. The initial SOC limit may indicate an initial amount of charge that a charging station will provide to the vehicle to increase a charge level of the vehicle. The method may also include estimating an arrival time of the user at the vehicle. The arrival time may be based on a current location of the user. The method may further include calculating an adjusted SOC limit based on the arrival time of the user. The method yet may further include setting the adjusted SOC limit so that the charging station will provide an adjusted amount of charge to the vehicle corresponding to the adjusted SOC limit.

According to a further aspect, a non-transitory computer readable storage medium storing instructions that when executed by a computer, which includes a processor to perform a method is provided. The method may include determining an initial SOC limit for a vehicle associated with a user. The initial SOC limit may indicate an initial amount of charge that a charging station will provide to the vehicle to increase a charge level of the vehicle. The method may also include estimating an arrival time of the user at the vehicle. The arrival time may be based on a current location of the user. The method further may include calculating an adjusted SOC limit based on the arrival time of the user. The method yet may further include setting the adjusted SOC limit so that the charging station will provide an adjusted amount of charge to the vehicle corresponding to the adjusted SOC limit.

DETAILED DESCRIPTION

Figure 1:
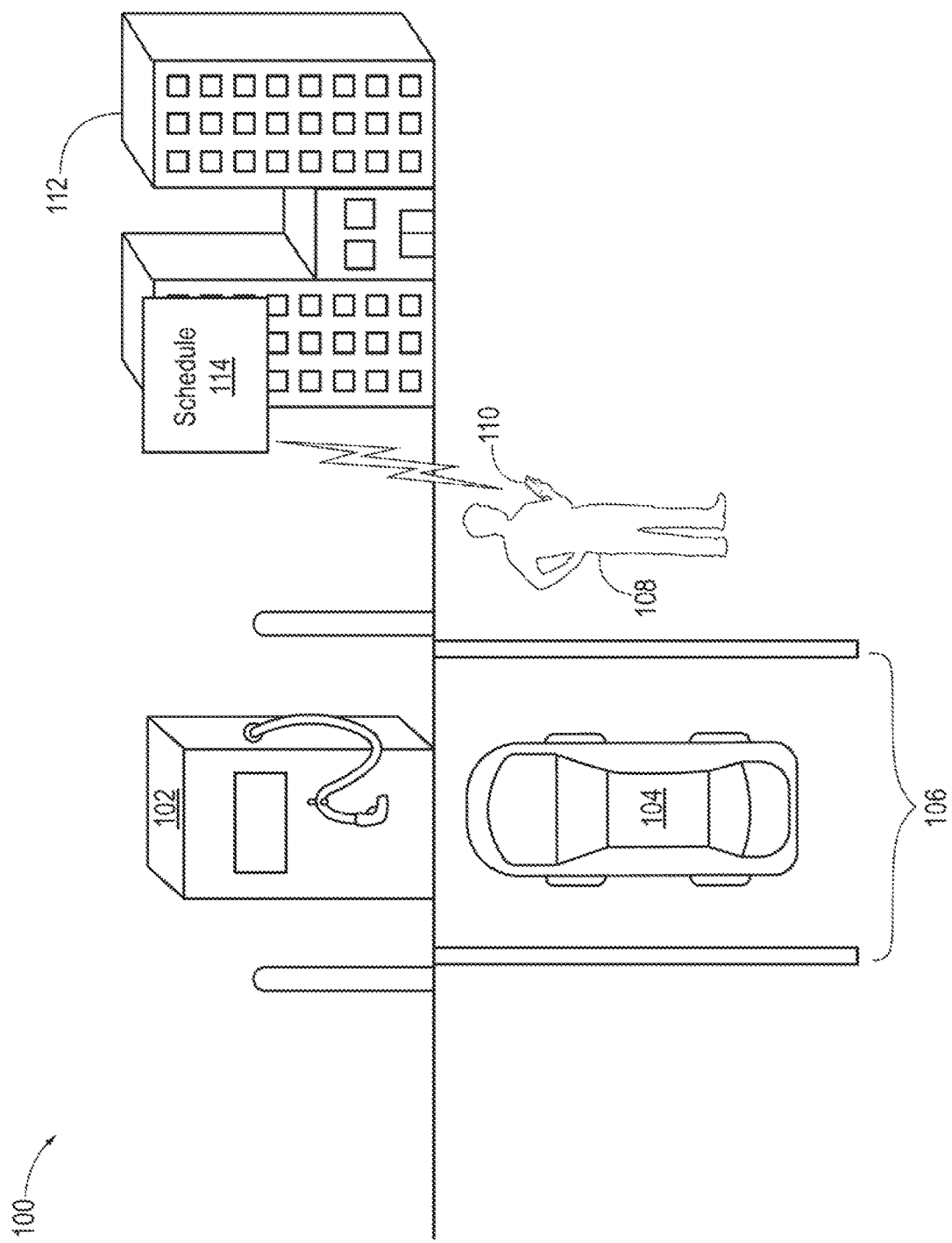
FIG. 1 is a schematic view of an exemplary parking area having a charging station, according to one embodiment.

State of charge (SOC) is the level of charge of an electric battery relative to its capacity. The units of SOC may be percentage points (0%=empty; 100%=full). In a battery electric vehicle (BEV) (HV), or plug-in hybrid electric vehicle (PHEV), the SOC for the battery pack is the equivalent of a fuel gauge. However, repeatedly charging the battery to 100% may have a negative impact on battery life.

Furthermore, users may have to wait to access public charging stations. During a long-distance trip or even during a routine charging session, a user may opt to leave their vehicle during charge in order to eat, shop, or take a bathroom break, etc. While users are aware of approximately how long a charging session may last, the length of the charging session may vary based on charging factors, such as usage of the charger by other vehicles, charging speed, ambient temperature, etc. This 'fluctuation' of charging time adds uncertainty to the length of the charging session. Accordingly, the user may experience pressure or anxiety to return to the vehicle promptly once the vehicle has finished charging.

If a user does not return promptly, a vehicle may occupy a charging station even after it has been charged to a predetermined SOC limit. Suppose that a user is visiting a bar or restaurant. The user may park their vehicle at a charging station because charging stations are typically located in preferred parking spaces, for example, near the entrance. The vehicle may only need to be charged for two hours to reach the predetermined SOC limit. The user 108 may plan to be back within 2 hours, but only begin leaving at the 2-hour mark. Accordingly, the vehicle may occupy the parking space associated with the charging station for longer than two hours, after the charging session has ended, while the user is returning. Other vehicles may not be able to access the charging station to receive a charge while the previously parked vehicle is sitting in the parking space not receiving a charge. Therefore, some charging stations have implemented an idle penalty for vehicles that occupy the parking space associated with the charging station when not receiving a charge. In addition, many chargers have idle fees associated with it, where the BEV owner may incur a fee, typically per minute, for leaving their car plugged in after finished charging.

The systems and methods described herein provide an adjusted SOC limit for the user in order to accommodate the user's schedule. Charging systems may provide different charging options. The adjusted SOC limit may be associated with a charging option that provides the vehicle with the desired charge while avoiding any penalties. Continuing the example from above, an adjusted SOC limit may be used to charge the vehicle for a longer amount of time if the user is going to unexpectedly spend a longer time away from the vehicle. Continuing the example from above, the adjusted SOC limit may be calculated based on the proximity of the user. For example, the proximity of the user may be determined in order to calculate the return rate of the user. Thus, the adjusted SOC limit may be calculated to charge the vehicle in a manner that comports with the user's return to the vehicle. Moreover, the user may avoid incurring idle penalties because the vehicle would be charging for an amount of time corresponding to the length of time that user is actually away.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle may engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computers and/or may be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein may include input and/or output devices for receiving input and/or devices for outputting data. The input and/or output may be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk, data store, and/or a memory.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, plasma display panels, touch screen displays, among others, that are often found in vehicles to display information about the vehicle. The display may receive input (e.g., touch input, keyboard input, input from various other input devices, etc.) from a user. The display may be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Station systems," as used herein may include, but is not limited to, any system that may be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

A "user," as used herein may include, but is not limited to, one or more biological beings exerting a demand on a source of energy, such as an electrical grid. The user may be a driver or a passenger of a vehicle.

"Value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle. The autonomous vehicle may carry one or more users. Further, the term "vehicle" may include vehicles that are automated or non-automated with pre-determined paths or free-moving vehicles.

I. Systems Overview

Referring now to the drawings, the showings are for purposes of illustrating one or more exemplary embodiments and not for purposes of limiting the same. FIG. 1 is a parking area 100 including the charging station 102. The charging station 102 provides energy to vehicles, such as the vehicle 104, here shown in parking space 106. Here, the charging station 102 is specifically associated with the parking space 106. However, the charging station 102 may be associated with a plurality of parking spaces.

In one or more embodiments, the charging station 102 may include charging equipment that may be installed in a private or public location for example, at a public (e.g., non-networked) or private (e.g., networked) charging station(s). The charging station 102 may include a charging station identification designation (e.g., identification number, serial number, alpha-numeric code, station name) that may be used to identify a particular charging stations. The charging station 102 may replenish the vehicle 104 using a charging energy source type that indicates the type of energy the charging station 102 provides. Energy may include clean renewable energy and non-renewable energy. Clean renewable energy may include, solar energy, hydro energy, biomass energy, wind energy, among others. Non-renewable energy may include electricity from a grid source supplied by one or more utility providers, and in the case of hybrid vehicles, fossil fuels.

In one or more configurations, the vehicle 104 may be capable of being fast charged based on fast charging components (not shown) that may be operably connected to the vehicle 104. Fast charging may enable the vehicle 104 to be charged at one or more charging speed tiers that provide a higher charging power (e.g., voltage, power, etc.) than a default charging speed tier or a slower charging speed tier. In some cases, the charging station 102 may include fast charging electric charging equipment (not shown) that may be facilitate the charging of the vehicle 104 at the one or more charging speed tiers.

In particular, the charging station 102 may provide one or more charging speed tiers that provide a default charging speed (e.g., where a default amount of charging power is provided to charge the vehicle 104 at a default charging speed) and/or one or more levels of fast charging speeds at one or more charging voltages. For example, one or more fast charging speed tiers may provide one or more levels of fast charging from a default charging speed tier or one or more slower charging speed tiers that may provide slower charging at one or more lower charging voltages (e.g., increase from 240 volts to 480 volts) to more quickly charge the vehicle 104 to the adjusted SOC.

In some embodiments, a user 108, associated with the vehicle 104, may occupy the parking area 100. The user 108 user may be a vehicle occupant. The user 108 may also have a portable device 110, such as a phone, key fob, personal fitness device, and activity tracker, among others. In another embodiment, the user 108 may be remotely located from the vehicle 104. For example, the vehicle 104 may have autonomously driven to the parking area 100 while the user 108 is somewhere else, such as a location 112. The location 112 may be a retail outlet, office, residence, manufacturer, hospital, restaurant, etc. The user 108 may transmit a schedule 114 associated with the vehicle 104 via, for example, the portable device 110. The schedule 114 indicates the plans and/or actions of the user. For example, the schedule may include a partial timeline for the vehicle 104 and/or the user 108. The schedule 114 may be dynamic and change with input or location of the user 108.

Figure 2:
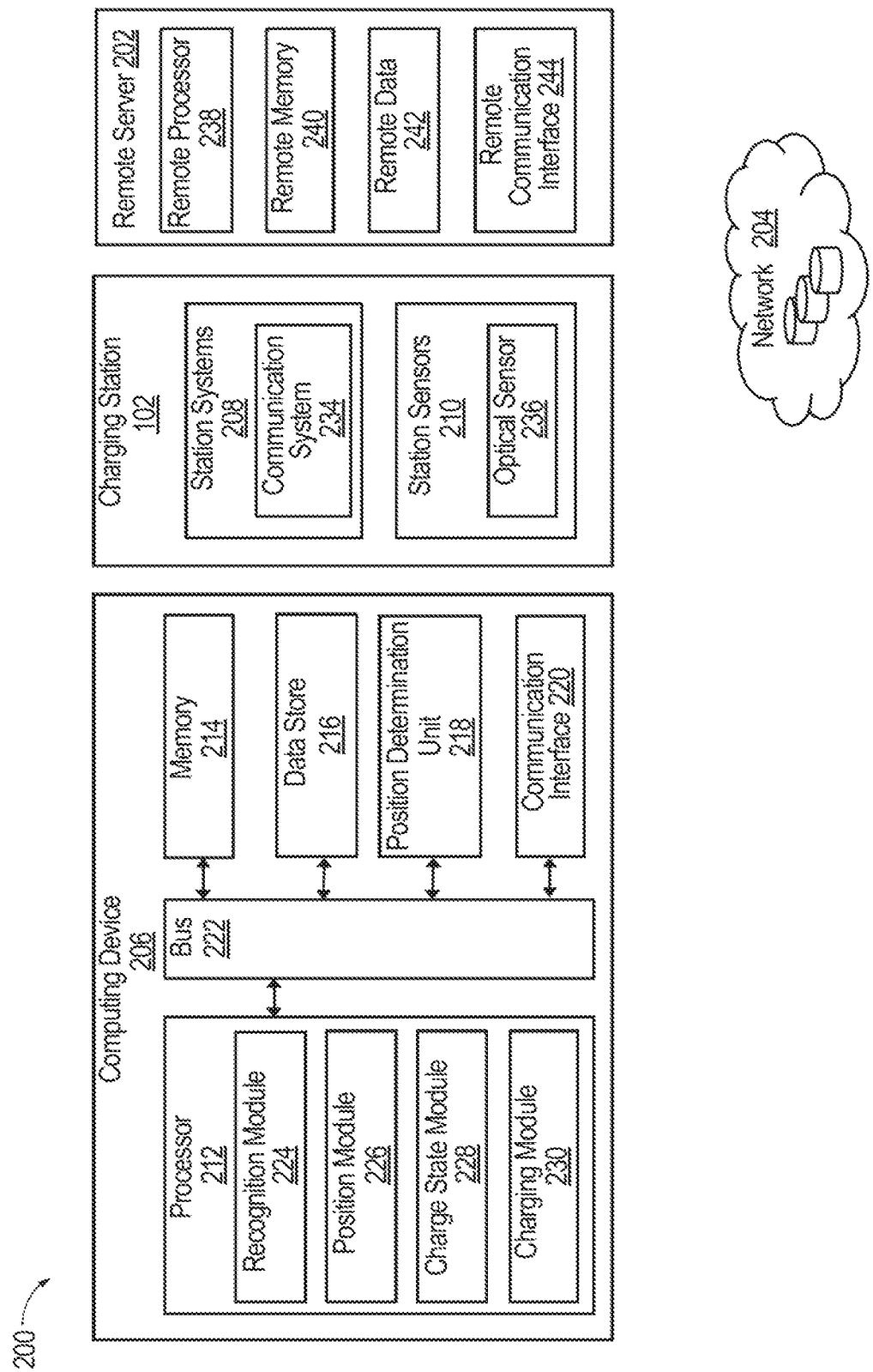
FIG. 2 is a block diagram of an operating environment for providing an adjusted SOC limit, according to one embodiment.

The user 108 and/or the vehicle 104 may access an operating environment 200, shown in FIG. 2, to charge the vehicle 104 to an adjusted SOC limit. For example, the user 108 may transmit the schedule 114 for charging the vehicle 104 from the portable device 110 to the operating environment 200. In another embodiment, the schedule 114 may be transmitted from the vehicle 104 to the operating environment 200.

FIG. 2, a block diagram of the operating environment 200 for providing the adjusted SOC limit according to an exemplary embodiment. One or more of the components of the operating environment 200 may be considered in whole or in part a vehicle communication network. The charging station 102 communicates with a remote server 202 over a network 204 and a computing device 206. The computing device 206 may be provided at the charging station 102, the portable device 110, the remote server 202, or other remote location operably connected to the charging station 102 and/or the remote server 202 via the network 204.

Station systems 208 and station sensors 210 communicate information about the charging station 102 or the physical environment (e.g., the parking area 100) of the charging station 102 to the computing device 206. In another embodiment, the operating environment 200 may be implemented as part of a telematics unit, a head unit, a navigation unit, an infotainment unit, an electronic control unit, among others of a vehicle, such as the vehicle 104 shown. The computing device 206 may be capable of providing wired or wireless computer communications utilizing various protocols to send/receive electronic signals internally to/from components of the operating environment. Additionally, the computing device 206 may be operably connected for internal computer communication via the bus 222 (e.g., a Controller Area Network (CAN) or a Local Interconnect Network (LIN) protocol bus) to facilitate data input and output between the computing device 206 and the components of the operating environment.

Generally, the computing device 206 includes a processor 212, a memory 214, a data store 216, a position determination unit 218, and a communication interface 220, which are each operably connected for computer communication via a bus 222 and/or other wired and wireless technologies defined herein. The computing device 206, may include provisions for processing, communicating, and interacting with various components of the charging station 102 and other components of the operating environment 200. As discussed above, the computing device 206 may be implemented with the charging station 102 or the vehicle 104, for example, as part of a telematics unit, a head unit, an infotainment unit, an electronic control unit, an on-board unit, or as part of a specific control system, among others. In other embodiments, the computing device 206 may be implemented remotely for example, with a portable device 110 or the remote server 202, connected via the network 204.

The processor 212 may include logic circuitry with hardware, firmware, and software architecture frameworks for remote control of the charging station 102. Thus, in some embodiments, the processor 212 may store application frameworks, kernels, libraries, drivers, application program interfaces, among others, to execute and control hardware and functions discussed herein. For example, the processor 212 may include a recognition module 224, position module 226, a charge state module 228, and a charging module 230, although the processor 212 may be configured into other architectures. The memory 214 and/or the data store 216 may store data about the charging station 102. Further, in some embodiments, the memory 214 and/or the data store 216 may store similar components as the processor 212 for execution by the processor 212.

The modules of the processor 212 may access the position determination unit 218 via the bus 222. The position determination unit 218 may include hardware (e.g., sensors) and software to determine and/or acquire position data about the vehicle 104. For example, the position determination unit 218 may include a global positioning system (GPS) unit (not shown) and/or an inertial measurement unit (IMU) (not shown). Thus, the position determination unit 218 may provide a geo-position of the charging station 102, the vehicle 104, the user 108, and the portable device 110, among others based on satellite data from, for example, a global position source (not shown), or from any Global Navigational Satellite infrastructure (GNSS), including GPS, Glonass (Russian) and/or Galileo (European). Further, the position determination unit 218 may provide dead-reckoning data or motion data from, for example, a gyroscope, accelerometer, magnetometers, among others.

The communication interface 220 may include software and hardware to facilitate data input and output between the components of the computing device 206 and other components of the operating environment 200, the vehicle 104, and/or the portable device 110. Specifically, the communication interface 220 may include network interface controllers (not shown) and other hardware and software that manages and/or monitors connections and controls bi-directional data transfer between the communication interface 220 and other components of the operating environment 200, the charging station 102, the vehicle 104, and/or the portable device 110 using, for example, the network 204.

Referring again to the charging station 102, the station systems 208 may include any type of vehicle control system and/or vehicle described herein to enhance the charging station 102 and/or safety of the charging station 102. Here, the station systems 208 may include a communication system 234. The communication system 234 may facilitate communication from the charging station 102 and access the communication protocols of other entities. For example, when communicating with the vehicle 104, the communication system 234 may determine a media access control (MAC) address of the vehicle 104. The communication system 234 may also facilitate communication with the user 108 via, for example, the portable device 110.

The station sensors 210, which may be implemented with the station systems 208, may include various types of sensors for use with the charging station 102 and/or the station systems 208 for detecting and/or sensing a parameter of the charging station 102, the station systems 208, charging information, and/or the environment surrounding the charging station 102. For example, the station sensors 210 may provide charging information about the current charge state of the charging station 102. The station sensors 210 may include, but are not limited to proximity sensors, vision sensors, motion sensors, environmental sensors, and charge sensors, among others. The station sensors 210 may be any type of sensor, for example, acoustic, electric, environmental, imaging, light, pressure, force, moisture, thermal, temperature, proximity, among others. For example, the station sensors 210 may include an optical sensor 236 for converting light information into electrical signals.

Using the system and network configuration discussed above, the computing device 206 may determine an adjusted SOC for the vehicle 104. In particular, the computing device 206 may manage the charging station 102, such that the computing device 206 sets the schedule, the charging rate, the type of charge provided, etc. for the charging station 102. For example, the charging station 102 may be operably connected for computer communication with the vehicle 104, additional electric vehicles (not shown), the computing device 206, and/or the remote server 202, for example, to transmit and receive data (e.g., charge parameters, charging data, feedback, vehicle system data, the schedule 114, a reservation interface, as will be discussed below) to and from the vehicle 104, any additional vehicles, the remote server 202 and/or the computing device 206. The remote server 202 may include a remote processor 238, remote memory 240, remote data 242, and remote communication interface 244. For example, the communication interface 220 and or the communication system 234 may be a wired or wireless link to the charging station 102. In one embodiment, the vehicle 104, additional vehicles, the charging station 102, the remote server 202 and/or the computing device 206 may be operably controlled to initiate or terminate charging of the vehicle 104 from the charging station 102 based on the systems and methods for providing the adjusted SOC as described herein.

In an exemplary embodiment, the vehicle 104, the charging station 102, any additional vehicles, and/or the remote server 202 may receive and transmit data through the network 204 to the computing device 206. The computing device 206 may include one or more computing devices (not shown) that may communicate with one or more charging station entities. Detailed embodiments describing exemplary methods using the system and network configuration discussed above will now be discussed in detail.

II. Methods for Providing an Adjusted SOC Limit

Figure 3:
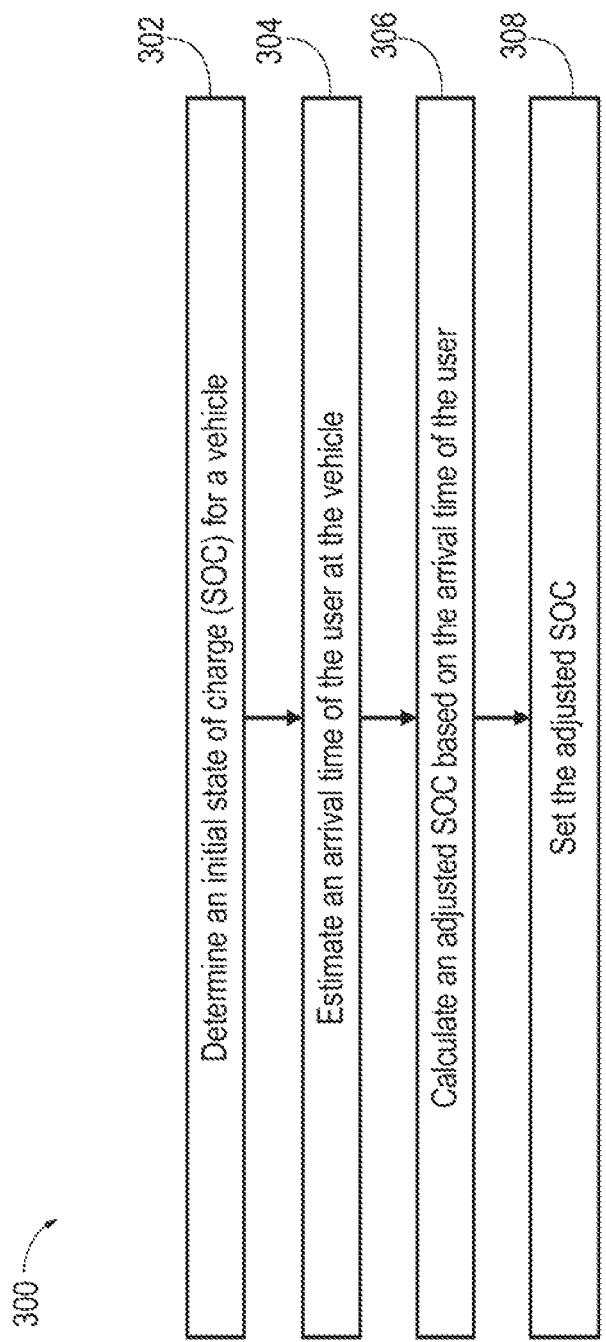
FIG. 3 is a process flow for providing an adjusted SOC limit, according to one embodiment.

Referring now to FIG. 3, a method 300 for providing an adjusted SOC limit according to an exemplary embodiment is provided. FIG. 3 will be described with reference to FIGS. 1 and 2. As shown in FIG. 3, the method 300 may be described by a number of steps. For simplicity, the method 300 will be described by these steps, but it is understood that the steps of the method 300 may be organized into different architectures, blocks, stages, and/or processes.

At block 302, the method 300 includes the recognition module 224 determining an initial SOC limit for a vehicle 104 associated with a user 108. The initial SOC limit indicates an initial amount of charge that a charging station will provide the vehicle 104 to increase a charge level of the vehicle 104. The initial SOC limit may be any value or level, but for clarity here will be described as a percentage of the battery capacity of the vehicle 104.

The initial SOC limit may be a default setting of the vehicle 104. For example, the vehicle 104 may default to an initial SOC limit of 80% of the total capacity of vehicle 104. In another embodiment, the initial SOC limit may be set based on the cost of charging the vehicle 104. For example, suppose the cost is $0.85 per kilowatt hour. The user 108 may be able to charge the vehicle 104 at their residence for $0.55. Therefore, the user 108 may only wish to charge the vehicle 104 to a lower SOC limit at the location 112 and wait to fully charge the vehicle 104 at the residence where the energy cost is less expensive. Accordingly, rather than 80% of the capacity of the battery, the initial SOC limit may be set to 60%. Thus, the initial SOC limit is determined based on a cost of the initial amount of charge. In another embodiment, the initial SOC limit may be determined on the distance to a primary location associated with the vehicle 104, such as the residence of the user 108. The farther away the primary location, the higher the recognition module 224 may set the initial SOC limit. The distance to the primary location may be determined by the position module 226.

In another embodiment, the recognition module 224 may determine the initial SOC limit based on the vehicle 104. For example, a default setting may be specific to the vehicle 104. Accordingly, the recognition module 224 may identify the vehicle 104 present at the charging station 102. The recognition module 224 may recognize the vehicle 104 based on the proximity of the vehicle 104 to the charging station 102. The proximity may be based on communication between the charging station 102, the vehicle 104, the portable device 110, and/or the recognition module 224. The recognition module 224 may also identify the vehicle 104 based on sensor data from the charging station 102. For example, the station systems 208 and/or the station sensors 210 may identify the vehicle 104. In one embodiment, an optical sensor 236 of the station sensors 210 may capture image data associated with the vehicle 104 or the charging station 102. The recognition module 224 may compare the image data to information about the vehicle 104. Accordingly, the recognition module 224 may identify the vehicle 104 based on characteristics (e.g., charging protocols, voltage pattern, make and model, license plate number, etc.). In another embodiment, the image data may be received from the remote server 202, the portable device 110, infrastructure from the parking area 100, roadside equipment (not shown) associated with the parking space 106, or from the vehicle 104.

The recognition module 224 may identify the vehicle 104 to access a vehicle profile that specifies the initial SOC limit. The vehicle profile may be stored at the recognition module 224, the vehicle 104, or the remote server 202. The vehicle profile may indicate various SOC levels corresponding energy cost ranges. For example, if the energy costs $0.51-$0.60 the vehicle profile may set the initial SOC to 90% of the battery capacity, $0.61-$0.70 the vehicle profile may set the initial SOC to 80% of the battery capacity, $0.71-$0.80 the vehicle profile may set the initial SOC to 70% of the battery capacity, and $0.81-$0.90 the vehicle profile may set the initial SOC to 60% of the battery capacity. Returning to the example from above in which the cost of energy is $0.85, the recognition module 224 may access the vehicle profile of the vehicle 104 and determine the initial SOC limit is 60% of the battery capacity based on the cost of the energy.

The recognition module 224 may also identify the vehicle 104 based on an interaction with the charging station 102. In one embodiment, the interaction may be defined by the charging station 102 being electrically engaged with the vehicle 104, for example, via a cable or connector is physically engaged with an adapter (not shown) of the vehicle 104. Thus, the recognition module 224 may identify the vehicle 104 based on an electrical connection between the vehicle 104 and the charging station 102. In another embodiment, suppose the charging station 102 may provide inductive charging by using, for example, inductive charging plates. When the vehicle 104 is in position to receive a charge via the inductive charging plates, the station systems 208 may receive charging parameters via the communication system 234. The recognition module 224 may identify the vehicle 104 based on the charging parameters.

A number of charging parameters are associated with the vehicle 104. The charging parameters may define the interactions of the vehicle 104 with other systems and objects, such as the station systems 208 of the charging station 102, the computing device 206, or the remote server 202. The charging parameters may include a default SOC limit, charging protocols, voltage pattern, engagement protocols, authentication information, and/or vehicle data about the vehicle 104. The vehicle data may information about the vehicle 104 such characteristics including the vehicle identification number, color, make, model, etc. The charging parameters may communicable to the systems and the objects. For example, the charging parameters may be communicated to the station systems 208 via the communication system 234 or the computing device 206 via the communication interface 220 and/or the network 204. Accordingly, in some embodiments, the recognition module 224 may determine the initial SOC limit for the vehicle 104 associated with the user 108, based on the identification of the vehicle 104, the characteristics of the vehicle 104, and/or the charging parameters associated with the vehicle 104.

Returning to FIG. 3, at block 304, the method 300 includes the position module 226 estimating an arrival time of the user 108 at the vehicle 104. The arrival time is based on a current location of the user 108. The position module 226 may identify the current location of the user 108 using location services, for example, the GPS, the position determination unit 218, etc., of the portable device 110. For example, the position module 226 may ping the portable device 110 the user 108. The portable device 110 may respond with response signal. The position module 226 may determine how far away the user 108 is based on the amount of time it takes to receive the response signal from the portable device 110. In another embodiment, the position module 226 may query the portable device 110 for location data and receive location data in response. The location data may include the current location of the portable device, and by extension the user 108, or may include information enabling the position module 226 to calculate the current location of the user 108. The location data may include coordinates of the portable device 110, radial distances, mapping, turn-by-turn directions, previous, current, or predictive locations of the portable device 110, etc.

The position module 226 estimates the arrival time of the user 108 based on the position of the user 108. Suppose that the user 108 is determined to be at the location 112. The position module 226 may determine a distance to the location 112, for example, the distance from the location 112 to the vehicle 104 at the charging station 102 may be a half mile. The position module 226 may store distances from the charging station 102 to local sites. In another embodiment, the position module 226 may access the remote server 202 to identify the current location of the user 108. For example, the remote server 202 may store distances from the charging station 102 to local sites, such as the location 112, in a look-up table. In another embodiment, the position module 226 may access the remote server 202 for location data associated with the user 108. In one embodiment, the user may check-in to the location 112 via social media platforms using the portable device 110. The remote server 202 may forward information about that check-in, such as the location 112 or location data to the position module 226.

When the location of the user 108 is known, the position module 226 may estimate the arrival time of the user 108 based on the return rate of the user 108. The return rate is an estimated or calculated speed at which the user 108 returns to the vehicle 104. The return rate may be based on the average footspeed of the user 108 or average footspeed an adult. The return rate may be personalized for the user based on an iterative determination of the current location of the user 108. For example, the position module 226 may calculate the return rate of the user 108 based on two or more locations of the user 108, such as a first location of the user 108 at a first time and a second location of the user 108 at the second time. In another embodiment, the return rate may be provided by the portable device 110. For example, the portable device 110 may generate and store portable device data. Suppose that the portable device 110 is an activity tracker. The portable device data may include information about the portable device 110 and/or the user 108, such as the position data, the speed of the user 108, and/or the return rate.

The position module 226 may also estimate the arrival time of the user 108 based on the schedule 114. For example, the schedule 114 may indicate the ending time of an event.

The position module 226 may determine that the end of the event will coincide with the arrival time of the user 108 at the vehicle 104. The schedule 114 may be associated with the user 108 or the location 112. Suppose the location 112 is a cinema. The schedule 114 may be the listing of movie times and run times associated with the cinema. Further suppose that the user 108 arrives at the charging station 102 associated with the location 112 at 8:15 PM and the next movie start time is listed 15 minutes later as 8:30 PM on the schedule 114 and has a runtime of 1.5 hours. The position module 226 may estimate the arrival time of the user as 15 minutes after the end of the movie and therefore be at 10:15 PM. The period of 15 minutes corresponds to the period between the vehicle 104 arriving at the charging station 102 and the start time of the movie. Here, the position module 226 may calculate the return rate of the user based on the vehicle 104 first arriving at the charging station 102 and the schedule 114. In another embodiment, the position module 226 may not determine a return rate. Returning to the example from above, the position module 226 may estimate the arrival time of the user 108 at the vehicle 104 as 10:00 PM, the end of the movie according to the schedule 114.

The schedule 114 may be received directly from the vehicle 104. For example, the vehicle 104 may access the portable device 110 or the remote server 202 to retrieve the schedule 114. In another embodiment, the schedule 114 may be maintained specifically for vehicle 104. Suppose that the vehicle is autonomously operated for hire, the schedule 114 may include origins, destinations, waypoints, pick-up time, and/or estimated arrival time. In one embodiment, the schedule 114 may include the time that the user 108 arrives at the charging station 102. The vehicle 104 may be monitored, managed, and/or operated by a third party using the remote server 202. Accordingly, the schedule 114 may be generated by the remote processor 238, stored in the remote memory 240, or included in the remote data 242.

The schedule 114 may also be based on the historical user data of the user 108. For example, the user may frequent the location 112 and return to the vehicle 104 at approximately the same time. Suppose that the location 112 is an office. The user 108 may return to the vehicle 104 at 5:30 PM when the vehicle 104 is engaged with a charging station 102 associated with the location 112. Accordingly, the position module 226 may estimate the arrival time of the user based on the historical user data included the schedule 114.

The schedule 114 may be generated by virtue of a reservation interface of the position module 226. The reservation interface may be utilized by the user 108 to submit a reservation, appointment, meeting, etc. that would be included in the schedule 114. In some embodiments, the schedule 114 may include a proposed charging session that the user 108 selects for the vehicle 104. The proposed charging session may include a predicted charging end time. The predicted charging end time may be based on the charging parameters. The position module 226 may estimate the arrival time of the user 108 at the vehicle 104 to coincide with the predicted charging end time of the schedule 114. The user 108 of the vehicle 104 may use a display (not shown) of the vehicle 104 and/or the portable device 110 as an input device for the reservation interface as one example of the parked period may be input from the user 108.

In some embodiments, the position module 226 is triggered to estimate the arrival time of the user 108. Therefore, in some embodiments, the position module may not act to estimate the arrival time until a charging parameter is satisfied. For example, the position module 226 may estimate the arrival time in response to the vehicle 104 receiving a threshold amount of charge. Suppose that the initial SOC limit is 60% of the battery capacity of the vehicle 104. The position module 226 may be triggered to estimate the arrival time of the user 108 when the vehicle reaches a threshold SOC of the initial SOC limit. If the threshold SOC corresponds to 5% of the battery capacity, the position module 226 would trigger the estimate of the arrival time when the vehicle 104 reaches 55% of the battery capacity given the initial SOC of 60%. Accordingly, the threshold SOC is a predetermined percentage of the initial SOC.

The position module 226 may also be triggered to estimate the arrival time of the user 108 based on a schedule 114 of the user 108. Returning to the cinema example from above, suppose that the end time of the movie is 10:00 PM. The position module 226 may be triggered to estimate the arrival time of the user 108 at 10:00 PM. In this manner, the position module 226 may determine if the user 108 is returning to the vehicle 104 or moving farther away. Suppose the user 108 moves from the cinema, a first location, towards a second location, such as an ice cream store. The position module 226 may estimate arrival time of the user 108 as becoming further in to the future as the user 108 is getting farther and farther away. Accordingly, position module 226 may be triggered based on the schedule 114.

At block 306, the method 300 includes the charge state module 228 calculating an adjusted SOC limit based on the arrival time of the user 108. As described above, charging the vehicle 104 to the full amount (i.e., 100% SOC) may decrease the life of the battery of the vehicle 104. Therefore, the initial SOC limit may be an SOC that is less that the full amount that allows the vehicle 104. In one embodiment, the adjusted SOC limit may increase the charge level from the initial SOC limit so that the user 108 is not charged idle fees if the initial SOC limit is reached before the user returns to the vehicle 104. In another embodiment, the adjusted SOC limit may decrease the charge level from the initial SOC limit. For example, the adjusted SOC limit may decrease the charge level if the user 108 is unexpectedly returning earlier. Accordingly, the adjusted SOC limit is a change to the initial SOC limit.

The adjusted SOC limit may also be based on the charging parameters between the charging station 102 the vehicle 104. For example, the charging parameters may include the charging rate and/or charging speed tiers associated with the charging station 102. In one embodiment, the charge state module 228 may calculate the adjusted SOC limit based on the parked period and the charging rate and/or charging speed tiers of the charging station 102. In this manner, the adjusted SOC limit may be calculated based on the length of time that vehicle 104 will be present in the parking space 106, based on the schedule 114, and how fast the charging station 102 will deliver energy to the vehicle 104.

The charging parameters may also include the pricing of energy received from the charging station 102. Suppose that the user 108 wishes to limit the amount of energy received from charging stations with high pricing. The charging parameters may include energy pricing. The charge state module 228 may compare the energy pricing of the charging station 102 to a cost threshold. If the energy pricing exceeds the cost threshold, the charge state module 228 may set a lower adjusted SOC limit to prevent the vehicle 104 from receiving too much energy at the high cost while also ensuring that the vehicle 104 has sufficient energy to meet the needs of the user 108. Conversely, if the energy pricing does not exceed the cost threshold, the charge state module 228 may set a higher adjusted SOC limit so that the user may take advantage of the lower energy pricing in a manner that satisfies the parked period.

In one embodiment, the charge state module 228 may calculate the adjusted SOC limit based on the arrival time of the user 108 determined based on the return rate. Suppose the position module 226 has determined that the user 108 is walking at a return rate of 20 minutes per mile and that the user is 1.5 miles away from the vehicle. Accordingly, the position module 226 may estimate the arrival time of the user 108 as being 30 minutes. The charge state module 228 may determine that based on the initial SOC limit that the vehicle 104 will complete charging in 5 minutes leaving the vehicle 104 idle at the charging station 102 for 25 minutes. Thus, the charge state module 228 may calculate the adjusted SOC limit to increase the initial SOC limit to keep the vehicle 104 charging for 25 minutes.

The charge state module 228 may calculate the adjusted SOC limit based on the charging parameters. For example, the charging rate may be 1% of battery capacity per 5 minutes. Suppose from the examples above that the initial SOC limit is set to 60% and that the vehicle 104 will need to be charged for the remaining 25 minutes after the initial SOC limit is met. The charge state module 228 may calculate the adjusted SOC limit to be 65% based on the charging rate and the remaining time.

Moreover the charge state module 228 may calculate the adjusted SOC limit based on the charging speed tiers available from the charging station 102. For example, the charging station 102 may have provided the vehicle 104 energy at a fast charging speed tier rather than a default charging speed tier to reach the initial SOC limit. Suppose the fast charging speed tier provides energy at a higher cost that the default charging speed tier. The charge state module 228 may calculate the time and/or cost associated with a number of candidate adjusted SOC limits corresponding to a plurality of the charging speed tier available. The charge state module 228 may then select the adjusted SOC limit from the number of candidate SOC limits based on a preference of the user 108, for example, to minimize cost. Suppose that the charging rate of charging rate may be 1% of battery capacity per 5 minutes is the fast charging speed tier and that the charging station 102 also offers a default charging speed tier of 1% of battery capacity per 15 minutes at a decreased cost. The charge state module 228 may calculate the adjusted SOC limit for the default charging speed tier as 62% and accordingly select both that the adjusted SOC limit be 62% and that the default charging speed tier be used once the initial SOC limit is met.

The charge state module 228 may modify the initial SOC limit to the adjusted SOC limit so that the vehicle 104 receives a continuous charge. In another embodiment, the charge state module may allow for a pause in charging. For example, the pause in charging may be less than a grace period associated with idle fees. Suppose that the charging station sensors 210 detect pauses in charging and if a pause lasts longer than five minutes an idle fee is assessed against the vehicle 104. Therefore, the charging station 102 has a five minute grace period with regard to idle fees. The charge state module 228 may schedule a three minute break in charging before resuming charging to take advantage of the grace period so the vehicle 104 is not assessed idle fees.

At block 308, the method 300 includes the charging module 230 setting the adjusted SOC limit so that the charging station will provide an adjusted amount of charge to the vehicle corresponding to the adjusted SOC limit. In this manner, the charging module 230 may communicate with the charging station 102, the vehicle 104, the user 108, the portable device 110, the computing device 206, and/or the remote server 202 among others. The charging module 230 may communicate adjusted SOC limit and possibly any charging parameters, for example, any charging parameters that arte to be adjusted based on the adjusted SOC limit, such as the charging speed tier. Accordingly, the charging module 230 may set the vehicle 104 to receive a charge until the adjusted SOC limit is reached. In some embodiments, the vehicle 104 may have an end ramp such that the charging speed is lower as the adjusted SOC limit is approached. The charging module 230 may set charging parameters, such as the charging speed tier, so that the adjusted SOC limit is reached according to the estimated arrival of the user 108 and/or the schedule 114. Therefore, the adjusted SOC limit is set for the vehicle 104 to better accommodate the user 108, the schedule 114, as well as any unexpected conditions that may affect the estimated arrival time of the user 108.

Figure 4:
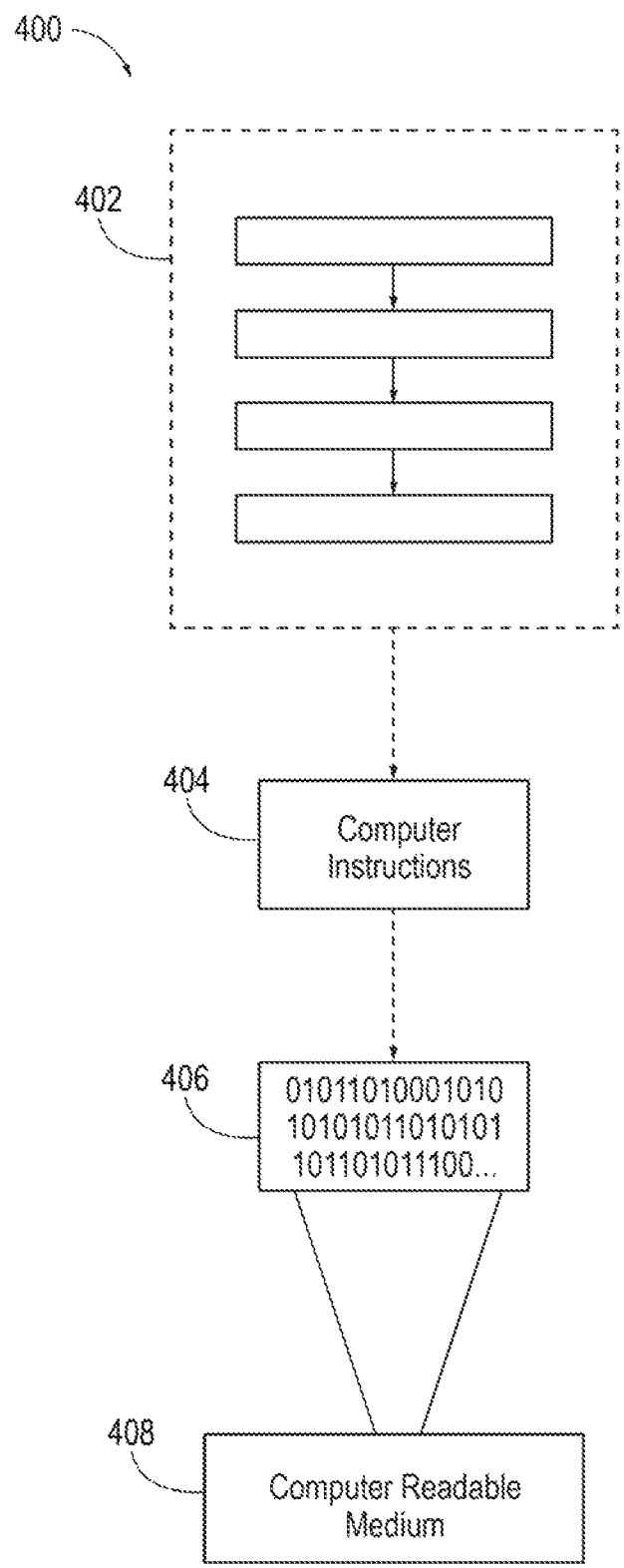
FIG. 4 is an illustration of an example computer-readable medium or computer-readable device including processor-executable instructions configured to embody one or more of the provisions set forth herein, according to one embodiment.

Still another aspect of the systems and methods for providing an adjusted SOC limit involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 3. In another aspect, the processor-executable computer instructions 404 may be configured to implement a system, such as the operating environment of FIG. 2. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
a recognition module configured to determine an initial state of charge (SOC) limit for a vehicle associated with a user, wherein the initial SOC limit indicates an initial amount of charge that a charging station will provide the vehicle to increase a charge level of the vehicle;
a position module configured to estimate an arrival time of the user at the vehicle, wherein the arrival time is based on a current location of the user;
a charge state module configured to automatically calculate an adjusted SOC limit based on the arrival time of the user; and
a charging module configured to set the adjusted SOC limit so that the charging station will provide an adjusted amount of charge to the vehicle corresponding to the adjusted SOC limit.

2. The system of claim 1, wherein the adjusted SOC limit increases the initial amount of charge that the charging station will provide to the vehicle.

3. The system of claim 1, wherein the current location of the user is based on portable device data of a portable device associated with the user, and wherein the portable device data includes a return rate of the user.

4. The system of claim 1, wherein the position module is triggered to estimate the arrival time of the user when the vehicle receives a threshold amount of charge corresponding to a threshold SOC.

5. The system of claim 4, wherein the threshold SOC is a predetermined percentage of the initial SOC limit.

6. The system of claim 1, wherein the position module is triggered to estimate the arrival time of the user based on a schedule of the user.

7. The system of claim 6, wherein the schedule of the user includes a proposed charging session with a predicted charging end time selected by the user, and the position module is triggered to estimate the arrival time of the user based on the predicted charging end time.

8. The system of claim 1, wherein the initial amount of charge indicated by the initial SOC limit increases the charge level of the vehicle to a charge level associated with the user driving the vehicle.

9. A method comprising:
determining an initial state of charge (SOC) limit for a vehicle associated with a user, wherein the initial SOC limit indicates an initial amount of charge that a charging station will provide the vehicle to increase a charge level of the vehicle;
estimating an arrival time of the user at the vehicle, wherein the arrival time is based on a current location of the user;
calculating an adjusted SOC limit based on the arrival time of the user; and
setting the adjusted SOC limit so that the charging station will provide an adjusted amount of charge to the vehicle corresponding to the adjusted SOC limit.

10. The method of claim 9, wherein the adjusted SOC limit increases the initial amount of charge that the charging station will provide to the vehicle.

11. The method of claim 9, wherein the current location of the user is based on portable device data of a portable device associated with the user.

12. The method of claim 11, wherein the portable device data includes a return rate of the user.

13. The method of claim 9, further comprising:
triggering the estimation of the arrival time of the user when the vehicle receives a threshold amount of charge corresponding to a threshold SOC.

14. The method of claim 9, further comprising:
triggering the estimation of the arrival time of the user based on a schedule of the user.

15. The method of claim 14, wherein the schedule is based on historical user data.

16. A non-transitory computer readable storage medium storing instructions that when executed by a computer, which includes a processor to perform a method comprising:
determining an initial state of charge (SOC) limit for a vehicle associated with a user, wherein the initial SOC indicates an initial amount of charge that a charging station will provide the vehicle to increase a charge level of the vehicle;
estimating an arrival time of the user at the vehicle, wherein the arrival time is based on a current location of the user;
calculating an adjusted SOC limit based on the arrival time of the user; and
setting the adjusted SOC limit so that the charging station will provide an adjusted amount of charge to the vehicle corresponding to the adjusted SOC limit.

17. The non-transitory computer readable storage medium of claim 16, wherein the adjusted SOC limit increases the initial amount of charge that the charging station will provide to the vehicle.

18. The non-transitory computer readable storage medium of claim 16, wherein the current location of the user is based on portable device data of a portable device associated with the user, and wherein the portable device data includes a return rate of the user.

19. The non-transitory computer readable storage medium of claim 16, the method further comprising:
 triggering the estimation of the arrival time of the user when the vehicle receives a threshold amount of charge corresponding to a threshold SOC.

20. The non-transitory computer readable storage medium of claim 19, the method further comprising:
 triggering the estimation of the arrival time based on a schedule of the user.

* * * * *